United States Patent [19]
Krivopal

[11] Patent Number: 5,989,700
[45] Date of Patent: *Nov. 23, 1999

[54] PRESSURE SENSITIVE INK MEANS, AND METHODS OF USE

[75] Inventor: Boris Krivopal, Brighton, Mass.

[73] Assignee: Tekscan Incorporated, South Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/583,444

[22] Filed: Jan. 5, 1996

[51] Int. Cl.⁶ ............................... B32B 5/16; B32B 7/02
[52] U.S. Cl. .................. 428/323; 428/215; 523/161; 524/493; 524/495; 524/496; 73/88; 73/763; 73/862.68
[58] Field of Search .................... 428/215, 323; 523/161; 524/495, 496, 493; 73/763, 862.68, 88

[56] References Cited

U.S. PATENT DOCUMENTS

| | | | |
|---|---|---|---|
| 3,992,212 | 11/1976 | Youtsey et al. | 106/1.14 |
| 4,155,262 | 5/1979 | Wong et al. | 73/754 |
| 4,203,648 | 5/1980 | Seidler | 439/876 |
| 4,314,227 | 2/1982 | Eventoff | 338/99 |
| 4,426,884 | 1/1984 | Polchaninoff | 73/172 |
| 4,433,223 | 2/1984 | Larson et al. | 200/512 |
| 4,488,873 | 12/1984 | Bloomfield et al. | 433/71 |
| 4,495,236 | 1/1985 | Obara et al. | 428/172 |
| 4,506,250 | 3/1985 | Kirby | 338/5 |
| 4,518,833 | 5/1985 | Watkins | 200/5 A |
| 4,555,953 | 12/1985 | Dario et al. | 73/862.046 |
| 4,634,623 | 1/1987 | Watkins | 428/208 |
| 4,684,563 | 8/1987 | Hayashi et al. | 428/207 |
| 4,734,034 | 3/1988 | Maness et al. | 433/68 |
| 4,856,993 | 8/1989 | Maness et al. | 433/68 |
| 5,033,291 | 7/1991 | Podoloff et al. | 73/172 |
| 5,086,785 | 2/1992 | Gentile et al. | 600/595 |
| 5,302,936 | 4/1994 | Yauiger | 338/47 |
| 5,541,570 | 7/1996 | McDowell | 338/47 |

FOREIGN PATENT DOCUMENTS

| | | |
|---|---|---|
| 0223355 | 5/1987 | European Pat. Off. . |
| 2192186 | 1/1988 | United Kingdom . |

OTHER PUBLICATIONS

NASA Technical Support Package "Pressure–Sensitive Resistor Material", Jan. 1986.
(C) WPI/DERWENT —Abstract J61–207939 Sep. 16, 1986.
PCT/US96/19758; Search Report C–1, Apr. 29, 1997.
H. P. Stevens, *Pressure–Sensitive Resistor Material*, Jan. 1986, pp. I, 1–5, NASA Tech Brief, vol. 10, No. 1, Item #25 from JPL Invention Report NPO–16537/6043.

*Primary Examiner*—Marion McCamish
*Assistant Examiner*—John J. Guarriello
*Attorney, Agent, or Firm*—Wolf, Greenfield & Sacks, P.C.

[57] ABSTRACT

Pressure sensitive inks have selected pressure sensitivity designed for use as a pressure sensitive component of a pressure sensitive device. The ink of the device is formed of an elastic polymer binder with a filler therefor of semiconductive nanoparticles preferably uniformly dispersed in the binder.

8 Claims, 3 Drawing Sheets

PRESSURE SENSITIVE INK MEANS, AND METHODS OF USE

This invention relates to pressure sensitive ink, devices incorporating such ink and methods of use of such ink, wherein the ink has a high level of performance, consistency and accuracy of electromechanical property.

BACKGROUND OF THE INVENTION

Pressure sensitive inks are well known for use in a variety of applications where it is desirable to obtain various electrical outputs in response to varying pressure or force applied across a layer or laminate of the ink, and in particular for use in various tactile or pressure sensitive devices of the type described in U.S. Pat. Nos. 4,856,993, 4,734,034 and 5,033,291. Such devices are capable of creating electrical signals with a monotony dependent upon applied mechanical pressure or force. Such devices include pressure transducers, sensors, strain gauges and the like.

Prior art inks sometimes have difficulties in applications in pressure sensitive devices due to limitations on one or more of hysteresis characteristics, sensitivity, temperature stability, difficulty in manufacturing and lack of consistency and accuracy in general electromechanical properties. For example, temperature limitations can affect the ability of certain inks to be useful in certain pressure transducers. Many current inks are often capable of operation of temperatures only up to approximately 100° F.; however, there are applications where stability at temperatures in excess of 1000° F. is desirable or required.

Printed circuits, switches and the like often incorporate electrically conductive inks useful as conductors or resistors where pressure sensitive properties, i.e., variation in resistivity with applied pressure variation, is not identified or used. Some such devices may incorporate nanoparticle semiconductive material in elastic components to achieve conductivity.

SUMMARY OF THE INVENTION

It is an object of this invention to provide improved pressure sensitive inks which can be used in pressure sensitive devices to obtain high level of performance in such devices with consistency and accuracy of electromechanical property, including desired sensitivity, good hysteresis properties and desired temperature stability over an extended range of temperature as desired.

Still another object of this invention is to provide pressure sensitive devices which obtain a variation in electrical resistance with variation in pressure applied to the device wherein the devices have the pressure sensitive ink of the preceding object therein.

Still another object of this invention is to provide a method of using a pressure sensitive ink, in accordance with the preceding objects of this invention to determine force or pressure applied to a pressure sensitive device by obtaining an electrical indication of the force applied.

Still another object of this invention is to provide inks, methods and devices in accordance with the preceding objects wherein the ink used has an elastic polymer binder and a filler therefor of nanoparticles disbursed in the binder with the particles having a size in the range of from 1–1,000 nanometers.

Still another object of this invention is to provide an ink in accordance with the preceding objects wherein the polymer binder used is a phenoxy polymer which permits operation of pressure sensitive devices incorporating the ink over high temperature ranges with good sensitivity and consistency, particularly in pressure transducer devices.

According to the invention, a pressure sensitive ink having a selected pressure sensitivity is designed for use as a pressure sensitive component of a pressure sensitive device. The pressure sensitive ink is formed of an elastic, organic polymer binder and a filler of nanoparticles dispersed in the binder. The nanoparticles have a size in the range of from 1–1,000 nanometers and are preferably semiconductive particles with a preferred average particle size in the range of from 15–45 nanometers. In the preferred embodiment, the pressure sensitive ink when solidified in a layer of a pressure sensitive device has a resistivity of from about $10^2$ to about $10^6$ ohm-centimeter, with a sensitivity in the is range of from about 0.02 to 60,000 microSiemens/lb. with the particles comprising, about 1–7% by the weight of the ink/layer and being carbon particles.

Preferably, the ink of this invention can comprise a solvent, polymer binder and semiconductive particles such as carbon particles formed into a colloid system wherein the binder and particles all have particle sizes within the range of from about 1 to about 1,000 nanometers.

In the method of this invention for determining force applied to a pressure sensitive device, at least one layer of a solidified pressure sensitive ink forms at least a portion of the device. The ink comprises a polymeric binder as described above and a force is applied to the device with the resistance then being determined from which the force can be determined.

Preferably, the ink used in this invention comprises a polymeric binder of a phenoxy polymer having the following formula:

(n = 35 to 100)

uniformly admixed with carbon particles in the range of from 1–1000 nanoparticles and preferably 15–45 nanoparticles. Preferably n=35 to 60.

The invention further comprises an improvement in a pressure sensitive device for obtaining a variation in electrical resistance is with variation in pressure applied to the device. The device has a pressure sensitive component extending between points of the measurement of electrical resistance through the pressure sensitive component. The improvement has a pressure sensitive component having at least one layer of solidified pressure sensitive ink of this invention forming a portion of the device.

It is a feature of this invention that because of the improved pressure sensitive ink used in the methods and devices, one can obtain the high level of performance, consistency and accuracy of electromechanical properties. For example, pressure sensitive transducers and other devices can have good sensitivity over a desired wide temperature range including high temperature ranges. Hysteresis characteristics can be improved by selection of the organic polymer binder so as to avoid distortions and improve repeatability of successive cycles, thus obtaining stability over extended temperature ranges with good electrical characteristics. The pressure sensitive inks can be formulated and used in devices by conventional procedures.

For example, a single layer of ink can be solidified as by curing and or heating or drying with leads attached to upper and lower or side to side faces of the solidified ink. Thus, pressure sensitivity and electrical readout can be accomplished within a single layer. In other devices, plural layers are used with the leads between the uppermost layer and the lowermost layer wherein not only inherent elasticity of the device but also surface characteristics between the layers determine the electrical resistance readout and resulting properties of such devices.

BRIEF DESCRIPTION OF THE DRAWINGS

The above and other objects, features and advantages of the present invention will be better understood from a reading of the following specification in conjunction with the accompanying drawings in which.

BRIEF DESCRIPTION OF THE INVENTION

Figure 1:
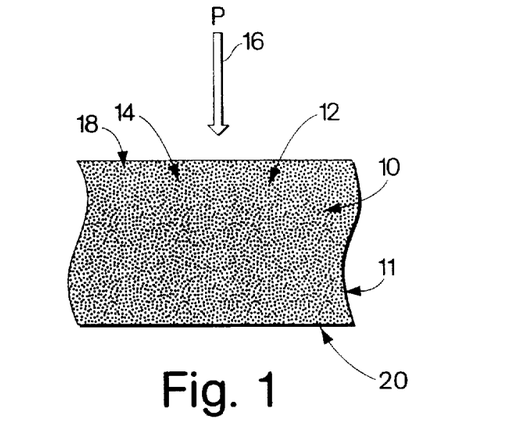
FIG. 1 is a semidiagrammatic cross-sectional showing of an ink in accordance with the preferred embodiment of this invention.

According to the invention, a pressure sensitive ink is shown at 10 in FIG. 1 having a polymeric binder 11 incorporating, preferably substantially uniformly therethrough, a plurality of particles which are preferably semiconductive, so that the ink when dried and cured gives an electrical resistivity change upon application and relaxation of pressure applied to the ink, which resistivity can be measured and is indicative of the pressure applied.

Figure 2:
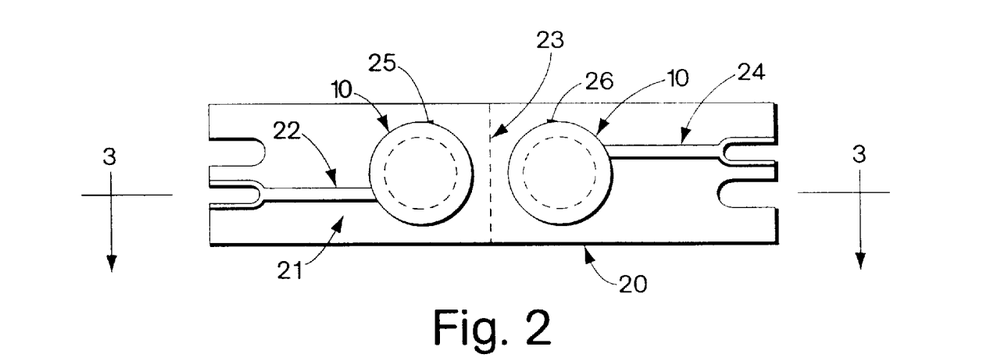
FIG. 2 is a top plan view of a pressure sensitive device in the form of a pressure sensitive transducer prior to final fabrication.

FIG. 2 shows a particular device 20 containing the pressure sensitive ink 10 incorporated into a button cell as known in the art. In the button cell or device 20, a thin insulating layer such as a plastic sheet or base 21 of Mylar, a polyester trademark product of DuPont Corp. of Wilmington, Del., a polyethylene terephalate base film or insulative plastic forms a base of the button cell. Other insulating polymers including polyethylene, PVC or even other insulators such as textiles or ceramics can be used for the base 21.

The base 21 has a conductive lead 22 on one side of a centerfold line 23 of the device. A second conductive lead 24 is on a second side of the device.

The leads 22 and 24 comprise round button portions 25, 26 respectively which are thin and highly conductive without application of pressure, preferably having a resistivity in the range of from $10^6$ to $10^4$ ohm-centimeters.

Figure 3:
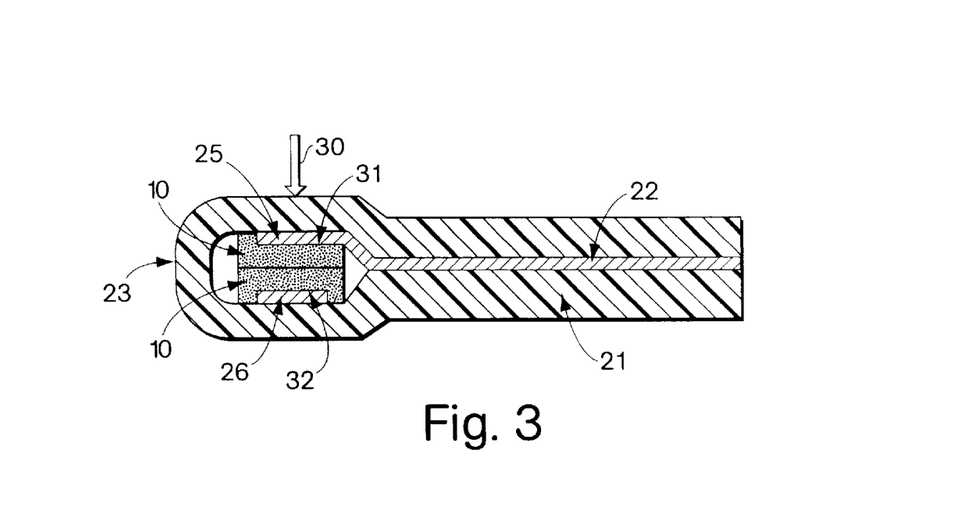
FIG. 3 is a side cross-sectional view thereof through line 3—3 of FIG. 2.

The disc portions of solidified ink 10 on either side of the center line 23 are spaced so as to overlie each other as best shown in FIG. 3, when the device is folded at the fold line 23 and attached through leads 22 and 24 to conventional electrical testing apparatus for measuring resistivity. Pressure or force on an upper surface of the upper layer 10 as shown in FIG. 3 applied through the arrow 30, enables the lead 24 and lead 22 to measure response and change in conductivity from an upper level of upper surface 31 to a lower surface 32 of the two layers of semiconductive ink. This change in resistivity with increasing or decreasing pressure is measured by standard electronics as known in the art. See, for example, U.S. Pat. No. 4,734,034 so that the pressure or force applied between the upper and lower surface of the conductive layers can be determined. That force can be applied by the hand of a user or by some mechanical means in a variety of pressure transducers and pressure measuring devices of all types known in the art.

The buttons or layers 10 in a laminate can vary in number. Preferably, their thickness is in the range of 0.00005 to 0.05 inch in thickness. In the button cell shown, two layers of the solidified ink are used, although many layers can be used. In some cases, a single layer enables measurement of pressure applied between two surfaces of the layer. Preferably, the pressure is applied so as to resiliently compress the solidified ink between the pressure or force applied to either surface of the layer or plurality of layers.

Typical pressure sensitive devices in which the inks of this invention can be used include pressure transducers such as load cells, button cells, strain gauges, pressure gauges and other pressure sensors.

The ink from which the dried layers 10 or other pressure sensitive layers for use in pressure transducers are formed, comprise a polymeric binder and nanoparticles.

The organic polymer binder can be any material which allows the layers formed to have elastic properties. When a single layer or plurality of layers of the solidified inks of this invention are compressed, conductivity is enhanced and resistivity drops. Therefore, some resilient deformation capability is preferred in the polymeric binder used. Useful organic polymer binders include polyester polymers, phenoxy polymers, epoxy polymers, acrylic polymers, vinyl polymers, polyamide polymers, polypropylenes, polyethylenes, silicones, elastomers such as natural and synthetic rubbers including styrene-butadiene copolymer, polychloroprene (neoprene), nitrile rubber, butyl rubber, polysulfide rubber ("Thiokol"), cis-1,4-polyisoprene, ethylene-propylene terpolymers (EPDM rubber), silicone rubber, and polyurethane rubber and other polymers of all kinds depending upon specific properties desired.

Phenoxy resins are preferred for use as the organic polymer since they provide extremely good properties in the final solidified ink, including good hysteresis characteristics, desired sensitivity, high temperature stability, good repeatability, and overall excellent electromechanical properties when used as a pressure sensitive ink, particularly in pressure sensitive transducer devices as for determining applied pressure by changes in electrical response.

Phenoxy resins useful in this invention are high molecular weight thermoplastic copolymers of bisphenol A and epichlorohydrin having the basic molecular structure:

n=35 to 100.

They use the same raw materials as epoxy resins, but contain no epoxy groups. They may be cured by reacting with polyisocyanates, anhydrides, or other crosslinking agents capable of reacting with hydroxyl groups but in the preferred embodiments are solidified by heat and evaporation of solvents alone.

The ductility of phenoxy resins resembles that of metals. They are transparent and are also characterized by low mold shrinkage, good dimensional stability, and moderate good resistance to temperature and corrosion.

They may be extruded or blow-molded. Parts may be thermally formed and heat- or solvent-welded. Some applications are blow-molded containers, pipe, ventilating ducts, and molded parts.

Such phenoxy resins are tough, ductile polymers with high cohesive strength and good impact resistance. Their ether linkages and pendant hydroxyl groups promote wetting and bonding to various substrates and fillers. The polymer binders can be supplied in pellet form, water born dispersion, powder and solvent solutions.

Phenoxy polymers are particularly useful, partially because they often do not crystallize or build up stress concentrations. They have high temperature characteristics that enable stability at a varying range of temperatures including temperatures above 100° F. Such polymers are available from Union Carbide of Danbury, Conn. as Paphen, phenoxy resins and are also available as UCAR phenoxy resins. UCAR phenoxy resins PKHH and PKHJ are white translucent pellets with a hydroxy content of 6% by weight, a hydroxy equivalent weight g/g-mol of 284 with molecular weights of 30,000–80,000, glass transition temperatures (Tg)° C. of 98. Tensile strength can be in the range of from about 9,000–9,500 with ultimate tensile elongation of 50–100%. Tensile modules in p.s.i. can be 300,000–325,000. Such resins are preferred, but other phenoxy polymers also known as poly(hydroxy ether) polymers can be used. Such resins can have melting points up to 180° C. enabling use over wide temperature ranges without distortion.

Preferably, the polymer binder used is a high molecular weight elastic polymer. As used herein, an elastic polymer is one which allows a temporary change of dimensions caused by external pressure is or force, from the original dimensions which are restored after removal of the pressure or force with restoration occurring in less than one hour at standard room temperature of 25° C. Thus, repeat electrical response as, for example, change in resistivity is restored after removal of pressure or force in short time periods, preferably less than 10 seconds. But periods of an hour or longer for restoration of original electrical response are possible.

The ink itself has preferably formed as a colloid system in which the polymer binder and particles all have particle sizes within the range of from 1–1,000 nanometers. The particles are preferably homogeneously mixed in the colloid system.

The particles used are preferably semiconductive particles and more preferably carbon particles having average particle sizes of 1 to 1,000 nanometers and preferably average particle size of from 15–45 nanometers with particle surface areas in the range of 25–560 square meters/gram and more preferably 240–265 square meters/gram with densities in the range of from preferably 18–6 lbs./cubic foot and more preferably 6–7 lbs./cubic foot. Preferably, the nanoparticles are used in an amount of from 1–7% by weight of the polymeric binder and particle combination, which is the solidified material formed as the working component of a pressure sensitive device. Preferably, all of the particles are uniformly distributed through the polymeric binder and are nanoparticles; although in some cases, some small amount of larger size particles may be used, such as up to 2% by weight, although they may detract from uniformity of electrical response in some cases. Preferably, when semiconductive particles are used, no more than 0.1% are larger than 1,000 nanometers. Semiconductive particles preferably have a resistivity of $10^2$ to $10^7$ ohm-centimeters.

Particles useful in this invention include semiconductive particles such as of antimony, silicon, magnetite, graphite, molybdenum, carbon, sulfide, carborundum, lead sulfide, ferrous sulfide, compounds of iron with carbon, phosphor and others. Nanoparticles of fillers or physical characteristic modifiers such as silica, talc, benton and the like can be used.

Average particle sizes can be in the range of 13–75 nanometers and most preferably 15–45 nanometers.

Semiconductive grade carbon blacks are preferred for use in this invention. Such carbon blacks are available from Cabot Corp. of Billerica, Mass. and Degussa Corp. of Ridgefield Park, N.J. Such carbon particles are preferred because of their semiconductive properties. They can be obtained in relatively inexpensive forms commonly sold on the market for other purposes. The degree to which carbon black renders a resistive polymer electrically conductive is influenced by its physical and chemical properties as well as content. Electron flows through a carbon black/polymer composite is achieved when the carbon black forms a conductive network within the polymer. In theory, electron flow occurs when the carbon particles are in contact or separated by very small distances. In the latter case, electrons tunnel through the resistive polymer from particle to particle or from aggregate to aggregate. The more particles that are in contact or close enough for tunneling to occur, the greater the composite's electrical conductivity. Surface area and structure characterize the physical properties of the primary particle and influence the degree of conductivity imparted by the carbon block. In this invention, it has been found that carbon particles, as previously described, can be used in extremely small amounts of from 1–7% by weight of carbon particle and binder and in fact, amounts of carbon particles in the range of from 2.85 to 3.5% by weight is useful for many pressure transducer applications. The level of carbon content in dry films created by drying and/or curing colloid systems often results in a film or layer which is not normally considered conductive or semiconductive before a pressure or force is applied. The resistivity of a solidified or dry film of the preferred polymeric inks of this invention is in a resistivity range of from $10^2$–$10^7$ ohm-centimeter. Force sensitivity is preferably in the range of from 0.02 to 60,000 microSiemens/lb. as used herein measurement of and reference to pressure can include measurement of force.

Suitable organic solvents for the polymer binders include ketones such as methyethyl ketone, glycol ethers, glycolethyl esters such as butyl cellosol acetate and dipropylene glycol monomethyl. The polymer percent by weight of solutions used are preferably in the range of 15 to 40% and more preferably 25 to 35%.

Colloid systems of the pressure sensitive inks of this invention can be formed in conventional manners. Preferably, solvent is mixed with the selected polymer binder after which the filler of nanoparticles can be disbursed in the binder with conventional mixing until a colloid system is formed. An initial colloid system so formed can act as a master batch with additional binder and/or particles being blended with the master batch to achieve ink having a desired selectivity as desired from the master batch.

The colloid system of the ink can be formed into solidified components of a pressure sensitive device by conventional drying and/or curing. The inks can be silk screened, doctor coated, sprayed, jet printed or applied in other conventional ways to a surface. They can be deposited as a thin layer of ink, in a predetermined pattern, on a selected surface and then dried or cured. Preferably, ink layers of from about 0.00015 to 0.00035 inch dried thickness are preferred for use in pressure sensitive devices of this invention, although thicker layers can be used. One or more layers can be used, depending upon the device. In some cases, the layers can be molded. While thin layers are preferred for use, the term "layer" as used in this application also includes shapes such as cylinders, rectangles, squares or other shapes as may be required for a specific application.

Drying is preferably carried out just above the evaporation temperature of the solvent for a period of time necessary to remove the solvent and solidify the layer. In some cases, the heat of drying can also provide a curing action.

Curing agents need not be used with many of the polymeric materials, although this varies with the material used.

Useful examples of preferred embodiments of pressure sensitive inks in accordance with this invention include the following:

EXAMPLE 1

A batch of organic polymer binder, which acts as a dielectric Component (A) of a pressure sensitive ink, is formed by a polyester resin solution (58% polyester) supplied by KC Coatings Inc. of Lenexa, Kans. under designation 9627 mix and overprint clear. A portion of Component (A) is saved as a master batch for later mixing with Component (B) to form a desired ink having a desired sensitivity determined at least in part by the amount of semiconductive particle content.

A batch of semiconductive Component (B) of a pressure sensitive resistive ink is then formed by dispersing, with the use of a Laboratory Dispersator Model 90 (Premier Corp. of Reading, Pa.) a semiconductive grade of carbon black powder in an amount of 12 parts by weight in 100 parts by weight of a portion of polyester resin solution (A) to obtain a homogeneous colloid system. The carbon black is obtained from Degussa Corp. of Ridgefield Park, N.J. and has an average particle size of 18 nanometers with surface area of 265 meters$^2$/gram. Component (B) is thus made of Component (A) with semiconductive particles.

Pressure sensitive ink can be formed with selective sensitivity with Components (B) and (A) made as above and admixed in a Stedfast Stirrer to form a second colloid system. The second colloid system is applied as a pressure sensitive layer by depositing a uniform layer of 0.0004–0.0006 inch on a surface and then drying and curing for 2–3 minutes at 140–160° F. in an Oven Model DC, Blue M obtained from General Signal of Millis, Mass. For example, (B) is admixed with (A) in 100 parts by weight (A) and 36 parts by weight (B), having a carbon content of 3.18% by weight.

EXAMPLE 2

A batch of polymeric binder, which acts as a dielectric Component (A) of a pressure sensitive ink, is formed by first forming a solution of 28% by weight of polyester resin supplied by Morton International, Inc. of Chicago, Ill. under designation or trademark Mor-Ester 49002 in 72% by weight of N-Methyl-2-Pyrrolidone obtained from GAF Chemical Corp. of Wayne, N.J. as M-PYROL.

The 28% solution of polyester resin in M-PYROL solvent is obtained by stirring in a StedFast Stirrer Model SL300 (Fisher Scientific) at 75°–80° F. until a clear solution is formed.

A batch of semiconductive Component (B) of a pressure sensitive resistive ink is then formed by dispersing, with the use of a Laboratory Dispersator Model 90 (Premier Corp. of Reading, Pa.) a semiconductive grade of carbon black powder in an amount of 12 parts by weight in 100 parts by weight of polyester resin solution (A) to obtain a homogeneous colloid system having Component (A) and semiconductive particles. The carbon black is obtained from Degussa Corp. of Ridgefield Park, N.J. and has an average particle size of 18 nanometers with surface area of 265 meters$^2$/gram.

Pressure sensitive ink can be formed with selective sensitivity with Components (B) and (A) made as above, admixed and then applied as a pressure sensitive component by depositing a uniform layer of 0.0004–0.0006 inch on a surface and then drying and curing for 2–3 minutes at 240–260° F. in an Oven Model DC, Blue M obtained from General Signal of Millis, Mass.

EXAMPLE 3

A batch of polymer resin Component (A) of a pressure sensitive ink is made as a colloid system, by dispersing a colloid grade of fumed silica obtained from Cabot Corp. of Tuscola, Ill. in an amount of 2% by weight with formulated Copolyester Resin Solution obtained from Morton International, Inc. of Chicago, Ill. under designation ADCOTE 89RIT, 94% by weight and Ethylene Glycol Monomethyl Ether Acetate obtained from Union Carbide under designation methyl cellosolve acetate, in an amount of 4% by weight.

A batch of the semiconductive Component (B) of a pressure sensitive resistive ink is made as a homogeneous colloid system by dispersing a semiconductive grade of carbon black powder (10 parts by weight and 100 parts of a resin solution) in:

The formulated Copolyester Resin Solution 68% by weight;

Epoxy Resin D.E.R. 661 (Dow Chemical Co.) 1.5% by weight;

Methylated Melamine Formaldehyde Resin solution Resimene 717 (obtained from Monsanto Chemical Co.) of St. Louis, Mo., 5% by weight;

Ethylene Glycol Monomethyl Ether Acetate obtained from Union Carbide, 25% by weight; and Butyrolacetone, obtained from GAF Chemical Corp., 5% by weight.

The Resin Solution is prepared by mechanically stirring in a StedFast Stirrer Model SL300 obtained from Fisher Scientific, the above ingredients at 75–90° F. until a solution is formed.

Carbon black obtained from Degussa Corp. characterized by average particle size of 13 nanometers with a surface area of 1,000 meters$^2$ per gram is blended into the mixture.

The resulting pressure sensitive ink of selected sensitivity (B) and (A) admixed as above is applied as a pressure sensitive component (in a layer or deposition of 0.0004–0.0006 inch) and is dried and cured at 5–6 minutes at a temperature of 160–180° F. in an Oven Model DC, Blue M obtained from General Signal of Millis, Mass.

EXAMPLE 4

A batch of dielectric Component (A) of the pressure sensitive ink is made as a solution of the 29 by weight of the Polyhydroxy Ether Resin obtained from Union Carbide of Danbury, Conn. under trade designation PKHH; UCAR® phenoxy resin in Ethylene Glycol Monobutyl Ether Acetate (Union Carbide)—71% by weight.

The batch is prepared by mechanical stirring (StedFast Stirrer Model SL300, Fisher Scientific) the above ingredients at 120–125° F. until clear solution was achieved.

A batch of the semiconductive Component (B) of the pressure sensitive resistive ink was made as a homogeneous colloid system by dispersing (Laboratory Dispersator Model 90, Premier Corp., Reading, Pa.) semiconductive grade of the carbon black powder, 13.6 weight parts, in a 100 weight parts of the above resin solution (A) to achieve a homogeneous colloid system. The carbon black is characterized by average particle size of 30 nanometers with surface area 265 $m^2$/gram, obtained from Cabot Corp. of Billerica, Mass. under designation Vulcan 72XC.

Pressure sensitive ink of selected sensitivity is made by (B) and (A) admixed in the ratios as shown in Table 1, applied as a pressure sensitive component (a layer or deposition of 0.0004–0.0006 inch) is dried/cured 3–4 minutes at 245–265° F. (Oven Model DC, Blue M General Signal). The values shown in Table 1 are obtained.

EXAMPLE 5

A batch of dielectric Component (A) of the pressure sensitive ink is made as a solution of the 29% by weight of the Polyhydroxy Ether Resin (Union Carbide) in a Ethylene Glycol Monobutyl Ether Acetate (Union Carbide)—71% by weight.

The batch is prepared by mechanical stirring (StedFast Stirrer Model SL300, Fisher Scientific) of the above ingredients at 120–125° F. until clear solution has been achieved.

A batch of the semiconductive Component (B) of the pressure sensitive resistive ink was made as a homogeneous colloid system by dispersing (StedFast Stirrer Model SL300, Fisher Scientific) semiconductive grade of the carbon black, 11 parts weight, in a 100 parts weight in the above resin solution of Polyhydroxy Ether Resin solution, which is the above dielectric Component (A)—93% by weight, Epoxy Resin D.E.R. 661 (Dow Chemical Co.)—1.5% by weight, Methylated Melamine-Formaldehyde Resin solution Resimene 717 (Monsanto Chemical Co.)—0.5% by weight, Ethylene Glycol Monomethyl Ether Acetate (Union Carbide)—25% by weight, Butyrolacetone (GAF Chemical Corp.)—5% by weight.

The carbon black used is characterized by average particle size 16nm with surface area 343 $m^2$/gr.

Pressure sensitive ink of a desired selected sensitivity is made by mixing (B) and (A) with the resulting solution applied as a pressure sensitive component (a layer or deposition of 0.0004–0.0006 inch) which is dried/cured 5–6 minutes at 245–265° F. (Oven Model DC, Blue M General Signal).

The inks of the above Examples can be compounded to achieve desired levels of sensitivity or to obtain variable electrical outputs in response to varying pressure or force applied across a properly cured layer or laminate. They can be used in various tactile or pressure sensitive devices of the type described for example in U.S. Pat. Nos. 4,856,993 and 5,033,291.

In Table 1 below, the electrical response of such devices made with the ink of Example 4 is defined by the ratio of the Component (B) to Component (A) or the amount of the semiconductive ingredient in the (A+B) colloid system. Appropriate sensitivity or output is presented as an increment of the Conductance with respect to Applied Force, microSiemen/Lb (mS/Lb), the average typical Volume Resistivities (Kohm-cm) of the appropriate cured colloid blends without any applied force or pressure as an electrical characteristic of the Resistive ink is presented as well (see Table 1).

TABLE 1

| (A + B), (colloid system) wt. parts, 1 | Component B, (colloid system) wt. % 2 | Carbon, (colloid system) wt. % 3 | Sensitivity, (under load) (dried, cured film) mS/Lb. 4 | Pressure Sensitive Ink Resistivity, (no pressure applied) (dried, cured film) Kohm-cm 5 |
|---|---|---|---|---|
| 100 + 26 | 20.63 | 2.47 | 0.63 | 1950 |
| 100 + 28 | 21.88 | 2.63 | 1.08 | 925 |
| 100 + 30 | 23.08 | 2.77 | 2.61 | 497 |
| 100 + 32 | 24.24 | 2.91 | 4.32 | 286 |
| 100 + 34 | 25.37 | 3.04 | 9.23 | 163 |
| 100 + 36 | 26.47 | 3.18 | 17.1 | 96 |
| 100 + 38 | 27.54 | 3.30 | 28.5 | 57 |
| 100 + 40 | 28.57 | 3.43 | 69.8 | 35 |
| 100 + 42 | 29.58 | 3.55 | 191 | 22 |
| 100 + 44 | 30.56 | 3.67 | 354 | 13.4 |
| 100 + 46 | 31.51 | 3.78 | 415 | 8.2 |
| 100 + 48 | 32.43 | 3.89 | 549 | 5.42 |
| 100 + 50 | 33.33 | 4.00 | 693 | 3.4 |
| 100 + 52 | 34.21 | 4.11 | 1520 | 2.2 |
| 100 + 54 | 35.06 | 4.21 | 2020 | 1.5 |
| 100 + 56 | 35.90 | 4.31 | 2350 | 1.1 |
| 100 + 58 | 36.71 | 4.41 | 2660 | 0.93 |
| 100 + 60 | 27.50 | 4.50 | 3040 | 0.88 |
| 100 + 62 | 38.27 | 4.59 | 3500 | 0.81 |

EXAMPLE 6

Figure 4:
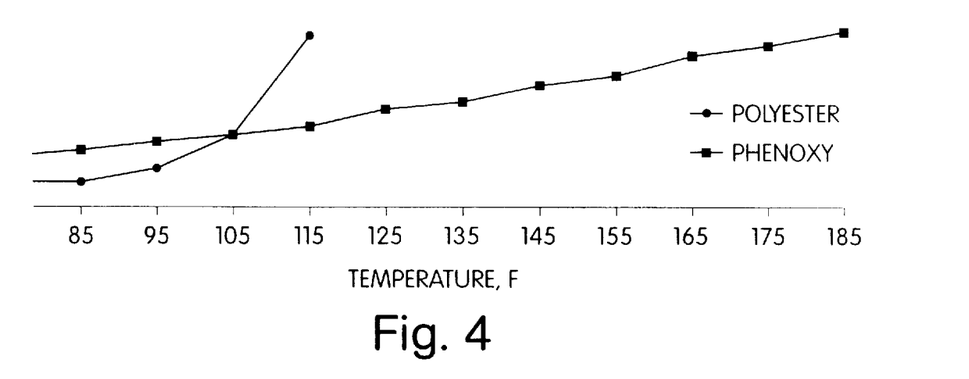
FIG. 4 is a graph of sensitivity against temperature in degrees Fahrenheit of a conventional PSI button cell as shown in FIG. 2 using a pressure sensitive ink of this invention.
Figure 5:
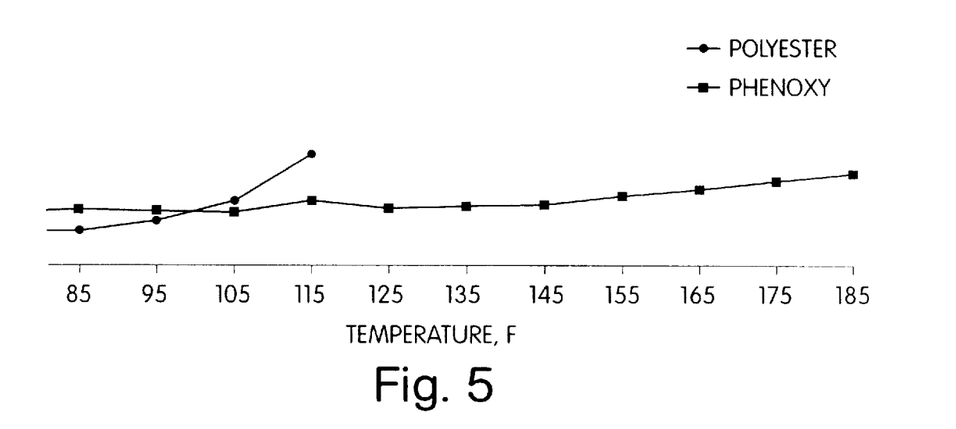
FIG. 5 is a hysteresis graph of hysteresis percent plotted against degrees Fahrenheit in a cured pressure resistive ink, button cell in accordance with this invention.
Figure 6:
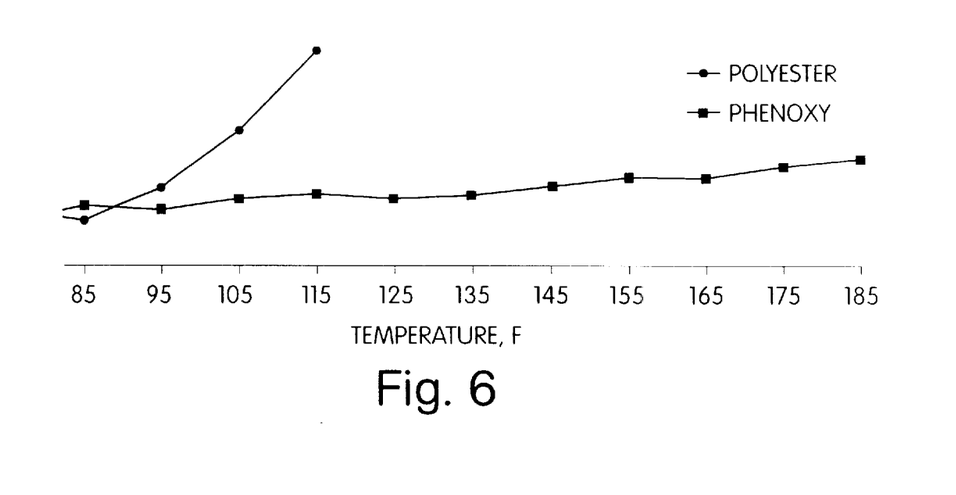
FIG. 6 is a graph of non repeatability percent against temperature in degrees Fahrenheit of a button cell in accordance with a preferred embodiment of this invention.
Figure 7:
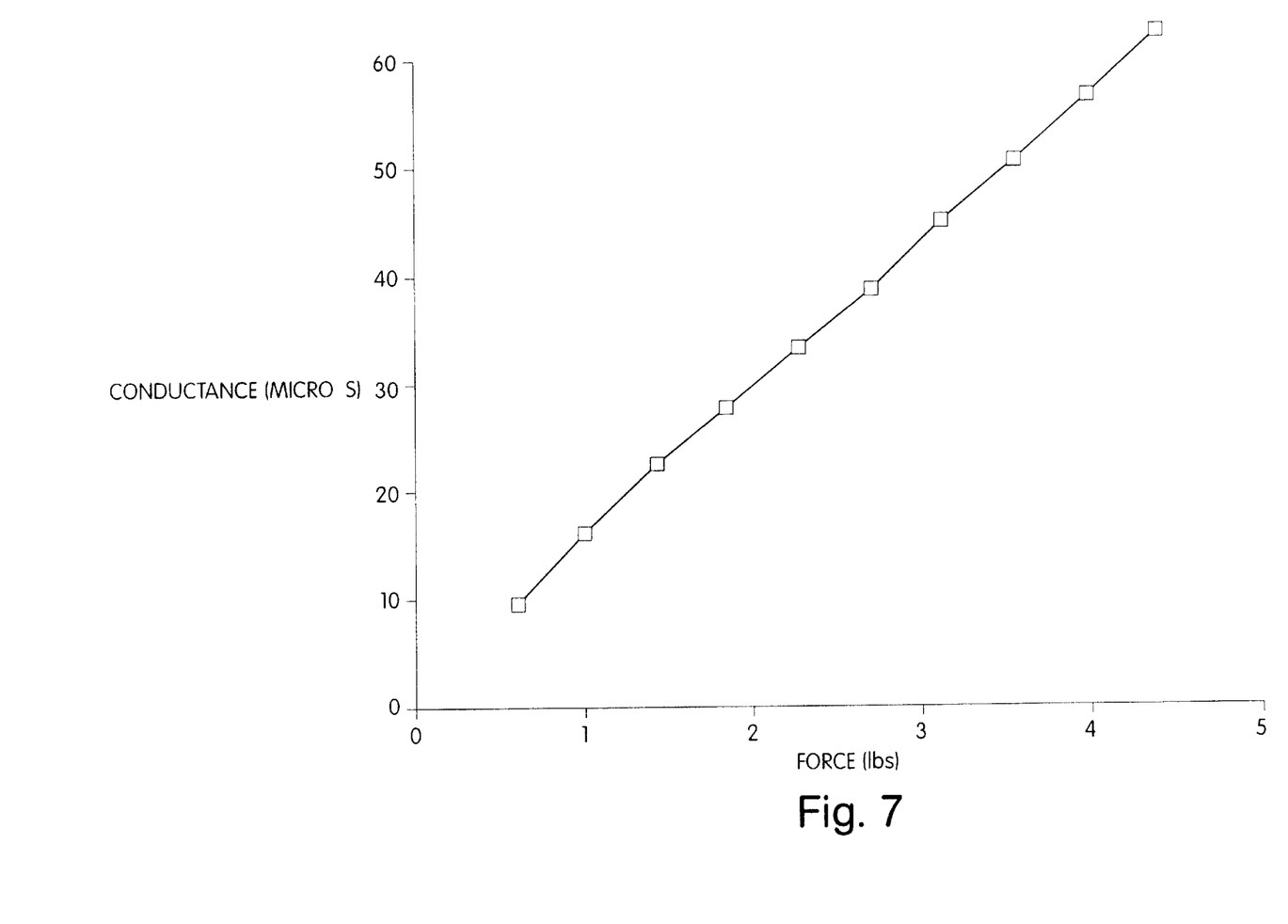
FIG. 7 is a graph of button cell conductance showing conductance vs. force at 23° C. for an ink of Example 4 containing 3.18% carbon.

N an example of forming a button contact cell or device 20 in accordance with the present invention, the ink of Example 4 is used in conjunction with the device 20 in accordance with FIGS. 2 and 3. In this case, a double layer film 21 is formed of Mylar, a trademark product of DuPont Corp. of Wilmington, Del., has a thickness of 0.001 inch and a rectangular dimension of 1.5×5 inches. The contacts 22 and 24 are deposited from a conductive ink formed of a polymer filled with silver 64% by weight silver particles to have a resistivity of 0.0005 ohm-centimeter obtained from Acheson of Port Huron, Mich. Layers 10 are each deposited as described in Example 4, having a diameter of 1 inch and a thickness of 0.00045 inch, with a resistivity of 96 Kohm-centimeter at 25° C. in the configuration shown in FIG. 3. The button contact of this invention shows the characteristics of FIGS. 4, 5, 6 and 7, where good sensitivity, good recovery, i.e. hysteresis recovery indicating stability and repeatability, is shown. In the graphs of FIGS. 4, 5 and 6, the test procedure involves applying maximum pressure of 366 p.s.i. (F=4.5 p.s.i., area 0.0123 sq. inch) without changing load/unload area in the temperature range, 75–185° F. The number of load/unload cycles at each 10° F. temperature increment equal 5. There is no release of pressure between cycles and the delay between cycles equal 2 seconds, with the delay at each step equal to 3 seconds.

The inks of this invention when dried, achieve extremely high levels of sensor functional properties such as desired repeatability, hysteresis, linearity, drift, and sensitivity, which can in some instances be at times better than some sensors heretofore known in the art. The use of the phenoxy resin with nanoparticles of carbon black in a colloid system is particularly useful as an outstanding pressure sensitive ink for use in the present invention. Residual solvents can be low in the polymeric binders of the present invention, with low extractables which might tend to change characteristics of pressure sensitive devices over time. Chemical curing of a radical nature which might cause shrinkage or induce stress can be avoided by proper selection of materials.

While specific embodiments of the present invention have been shown and described, it should be apparent to those skilled in the art that the foregoing and other changes in form and in detail may be made in the disclosed invention, methods of use and improved products, while still remaining within the spirit and scope of the invention. For example, while a two component, i.e., (A) and (B), manufacturing procedure for the inks of this invention are preferred, the inks can be made by forming a single, final, desired, ink simply by forming a colloid system of semiconductive particles directly in a polymer binder in the final desired proportion.

I claim:

1. In a pressure sensitive device for obtaining a variation in electrical resistance with variation in pressure applied to said device, said device having a pressure sensitive component extending between points for measurement of resistance through said pressure sensitive component, the improvement comprising, said pressure sensitive component comprising at least one layer of solidified pressure sensitive ink forming at least a portion of said device positioned between said points of measurement so that pressure applied to said portion can produce a variation in electrical resistance which can be measured, said ink comprising a polymeric binder and nanoparticles disbursed in said binder, said nanoparticles having a particle size in the range of from 1–1,000 nanometers with said layer having a sensitivity in the range of from about 0.2 to 60,000 micro Siemens/lb. and said nanoparticles comprising from about 1 to about 10% by weight of said ink.

2. The improvement of claim 1 wherein said particles are uniformly distributed carbon particles and said polymeric binder is an elastic phenoxy resin.

3. The improvement of claim 2 wherein said pressure sensitive component comprises two contacting layers of said ink.

4. The improvement of claim 3 wherein said two contacting layers each have a range of thickness from 0.00005 to 0.05 inch.

5. The improvement of claim 2 wherein said nanoparticles have a particle size in the range from 13 to 75 nanometers.

6. The improvement of claim 1 wherein said particles are semiconductive particles comprising from 1–7% by weight of said ink and have an average particle size in the range of 13 to 75 nanometers.

7. The improvement of claim 6 wherein said pressure sensitive component has a resistivity of from $10^2$–$10^7$ ohm centimeters and said particles are carbon particles.

8. The improvement of claim 6 wherein said polymeric binder is a phenoxy resin and said particles are carbon particles.

* * * * *

UNITED STATES PATENT AND TRADEMARK OFFICE

CERTIFICATE OF CORRECTION

Page 1 of 2

PATENT NO. : 5,989,700
DATED : November 23, 1999
INVENTOR(S) : Boris Krivopal

It is certified that error appears in the above-identified patent and that said Letters Patent is hereby corrected as shown below:

Column 3, line 67 "$10^6$ to $10^4$" should read -- $10^{-6}$ to $10^{-4}$ --.

Please correct the drawings as shown on the attached sheet to show the Y axis.

Signed and Sealed this

Twelfth Day of September, 2000

*Attest:*

Q. TODD DICKINSON

*Attesting Officer*     *Director of Patents and Trademarks*